United States Patent
Dong et al.

(10) Patent No.: US 7,876,839 B2
(45) Date of Patent: Jan. 25, 2011

(54) RECEIVER AND METHOD FOR CHANNEL ESTIMATION FOR MULTICARRIER COMMUNICATION SYSTEMS

(75) Inventors: Xiaofei Dong, Mountain View, CA (US); Qinghua Li, Sunnyvale, CA (US); Minnie Ho, Los Altos, CA (US); Hongming Zheng, Beijing (CN); Hongmei Sun, Beijing (CN); Shilpa Talwar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1427 days.

(21) Appl. No.: 11/323,819

(22) Filed: Dec. 30, 2005

(65) Prior Publication Data

US 2007/0153922 A1 Jul. 5, 2007

(51) Int. Cl.
*H04K 1/10* (2006.01)
(52) U.S. Cl. .................. 375/260; 375/343; 375/142; 375/150; 370/470; 370/471; 370/473; 370/509; 370/511
(58) Field of Classification Search .................. 375/260, 375/343, 142, 150; 708/422, 426, 290, 5; 370/470, 471, 473, 509, 511
See application file for complete search history.

(56) References Cited

U.S. PATENT DOCUMENTS

| | | | |
|---|---|---|---|
| 4,317,092 A * | 2/1982 | Potter | 333/165 |
| 7,072,693 B2 * | 7/2006 | Farlow et al. | 455/562.1 |
| 7,489,731 B2 * | 2/2009 | Coulson et al. | 375/260 |
| 7,631,029 B2 * | 12/2009 | Marsili | 708/422 |
| 2004/0264561 A1 * | 12/2004 | Alexander et al. | 375/232 |
| 2005/0111603 A1 * | 5/2005 | Ginesi et al. | 375/362 |
| 2006/0146962 A1 * | 7/2006 | Troya et al. | 375/340 |

OTHER PUBLICATIONS

Li et al. "Robust channel estimation for OFDM systems with rapid dispersive fading channels", IEEE transaction on communcations 46 (7), Jul. 1998, pp. 902-915.*
Hoecher et al. "two-dimensional pilot-symbol-aided channel estimation by Weiner filtering", international conference on acoustics speech and signal processing, 1997, ICASSP-97 vol. 3, Apr. 1997, pp. 1845-1848.*
*M.1225—Guidelines for evaluation of radio transmission technologies for IMT-2000*, International Telecommunications Union Standard,(Feb. 1997),1-60.
Hoeher, P., et al., "Two-dimensional pilot-symbol-aided channel estimation by Wiener filtering", *International Conference on Acoustics, Speech, and Signal Processing, 1997. ICASSP-97*, vol. 3, (Apr. 24, 1997),1845-1848.
Li, Y., et al., "Robust channel estimation for OFDM systems with rapid dispersive fading channels", *IEEE Transactions on Communication*, 46(7), (Jul. 1998),902-915.

* cited by examiner

*Primary Examiner*—David C Payne
*Assistant Examiner*—Rahel Guarino
(74) *Attorney, Agent, or Firm*—Schwegman, Lundberg & Woessner, P.A.; Gregory J. Gorrie (57) ABSTRACT

Embodiments of system and method for generating channel estimates in a wireless network are generally described herein. Other embodiments may be described and claimed. In some embodiments, a linear interpolator uses refined cross-correlation and autocorrelation estimates and pilot subcarrier estimates to generate channel estimates for the current OFDM data symbol.

13 Claims, 5 Drawing Sheets

RECEIVER AND METHOD FOR CHANNEL ESTIMATION FOR MULTICARRIER COMMUNICATION SYSTEMS

TECHNICAL FIELD

Some embodiments of the present invention pertain to wireless communication systems. Some embodiments pertain to wireless communication networks that use orthogonal frequency division multiplexed (OFDM) signals.

BACKGROUND

Some conventional wireless systems use channel estimates to properly decode signals received through a wireless channel. The channel estimates take into account the frequency response of the channel. Some conventional wireless receivers use linear interpolation techniques for channel estimation; however these techniques may result in reduced performance at low signal-to-noise-and-interference ratios (SNIRs) and at high Doppler spread making these techniques less suitable for high-mobility applications. Other channel estimating techniques, such as mean-based methods, are less accurate for highly frequency-selective communication channels, which is often the case for many multicarrier wireless systems.

Thus, there are general needs for systems and methods that generate channel estimates. There are also general needs for systems and methods that generate channel estimates that are less susceptible in low SNIR and high Doppler-spread environments, as well as less sensitive to frequency selective communication channels.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of others. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
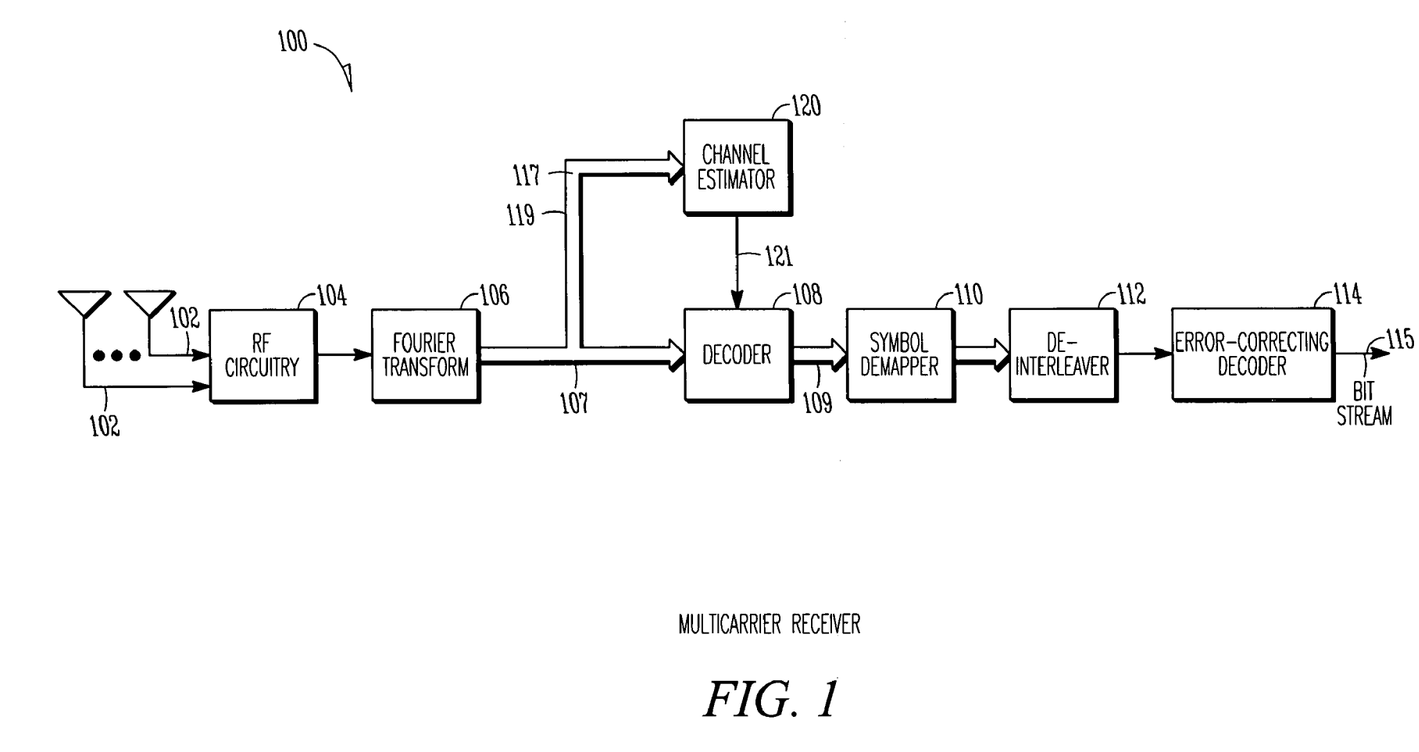
FIG. 1 is a block diagram of a multicarrier receiver in accordance with some embodiments of the present invention.

FIG. 1 is a block diagram of a multicarrier receiver in accordance with some embodiments of the present invention. Multicarrier receiver 100 receives multicarrier communication signals through one of more antennas 102, processes the signals and generates decoded bit stream 115. FIG. 1 may illustrate the physical (PHY) layer of a receiver and decoded bit stream 115 may be provided to a media-access control (MAC) layer of the receiver. Multicarrier receiver 100 may receive multicarrier communication signals from one or more transmitting stations and may include RF circuitry 104 to downconvert the received signals and generate digital baseband signals. Multicarrier receiver 100 may also include Fourier-transform circuitry 106 to perform a discrete Fourier transform (DFT) on the digital baseband signals provided by RF circuitry 104 and generate frequency-domain signals 107. In some embodiments, a frequency-domain signal may be generated for each subcarrier of the multicarrier communication signals received by multicarrier receiver 100. In some orthogonal frequency division multiplexed (OFDM) embodiments, frequency domain signals may comprise OFDM symbols. An OFDM symbol may comprise a plurality of sub-symbols wherein each sub-symbol is modulated on one of the subcarriers (i.e., tones). Multicarrier receiver 100 may also include decoder 108 to decode frequency domain signals 107 using channel estimates 121 and generate decision metrics 109, which may correspond to decoded symbols. In some multiple-input multiple-output (MIMO) embodiments, decoder 108 may be a space-time decoder, although the scope of the invention is not limited in this respect.

Multicarrier receiver 100 may also include channel estimator 120 to generate channel estimates 121 for use by decoder 108, among others. In some embodiments, the output of decoder 108 includes a pair of symbols for each subcarrier that represent a quadrature-amplitude modulation (QAM) constellation point, although the scope of the invention is not limited in this respect. Multicarrier receiver 100 may also include symbol demapper 110 to demap the decoded symbols to generate groups of bits, which may be deinterleaved by deinterleaver 112 and decoded by error-correcting decoder 114 to generate decoded bit stream 115. Multicarrier receiver 100 may also include other functional elements not specifically illustrated for ease of understanding.

In accordance with some embodiments of the present invention, channel estimator 120 generates channel estimates 121 for each OFDM symbol in a frame having a plurality of OFDM symbols. Channel estimator 120 may use both pilot and data subcarriers from OFDM preamble symbol 117 of the frame and may use pilot subcarriers of OFDM data symbols 119 of the frame to generate channel estimates 121 for each OFDM data symbol of the frame. In some embodiments, the frame may be an orthogonal frequency division multiple access (OFDMA) frame.

In accordance with some embodiments, channel estimator 120 determines an initial cross-correlation estimate between pilot and data subcarriers and an autocorrelation estimate between the pilot subcarriers from the OFDM preamble symbol of the frame. Channel estimator 120 may also perform low-pass filtering on the cross-correlation estimate and the autocorrelation estimate to remove noise to generate refined cross-correlation and autocorrelation estimates. In these embodiments, channel estimator 120 may also perform a Wiener interpolation using the refined cross-correlation and autocorrelation estimates and using pilot subcarrier estimates of a current OFDM data symbol to generate channel estimates 121 for the current OFDM data symbol. These embodiments are discussed in more detail below.

In some embodiments, multicarrier receiver 100 may be part of a wireless communication device that may communicate using a multiple access technique, such as OFDMA, over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers and/or each subcarrier may have an integer number of cycles within a symbol period, although the scope of the invention is not limited in this respect.

In some embodiments, multicarrier receiver 100 may be part of a communication station that operates within a broadband wireless access (BWA) network, such as a Worldwide Interoperability for Microwave Access (WiMax) network, although the scope of the invention is not limited in this respect as multicarrier receiver 100 may be part of almost any wireless communication device. In some embodiments, multicarrier receiver 100 may be part of a mobile station that estimates the downlink channel. In some other embodiments, multicarrier receiver 100 may be part of a base station that estimates the uplink channel. In some BWA network embodiments, the frequency spectrum for the multicarrier communication signals may comprise frequencies between 2 and 11 GHz, although the scope of the invention is not limited in this respect.

In some embodiments, multicarrier receiver 100 may communicate radio-frequency (RF) communications in accordance with specific communication standards, such as the Institute of Electrical and Electronics Engineers (IEEE) standards and proposed specifications including the IEEE 802.16-2004 and the IEEE 802.16(e) standards (e.g., IEEE std. 802.16(e) published Dec. 30, 2005) for wireless metropolitan area networks (WMANs) including variations and evolutions thereof. For more information with respect to IEEE 802.16 standards, refer to "Corrigendum to IEEE Standard for Local and Metropolitan Area Networks—Part 16: Air Interface for Fixed Broadband Wireless Access Systems," May 2005.

In some embodiments, multicarrier receiver 100 may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television, a medical device (e.g., a heart monitor, a blood pressure monitor, etc.) or other device that may receive and/or transmit information wirelessly. Antennas 102 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used.

Although multicarrier receiver 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of multicarrier receiver 100 may refer to one or more processes operating on one or more processing elements.

Figure 2:
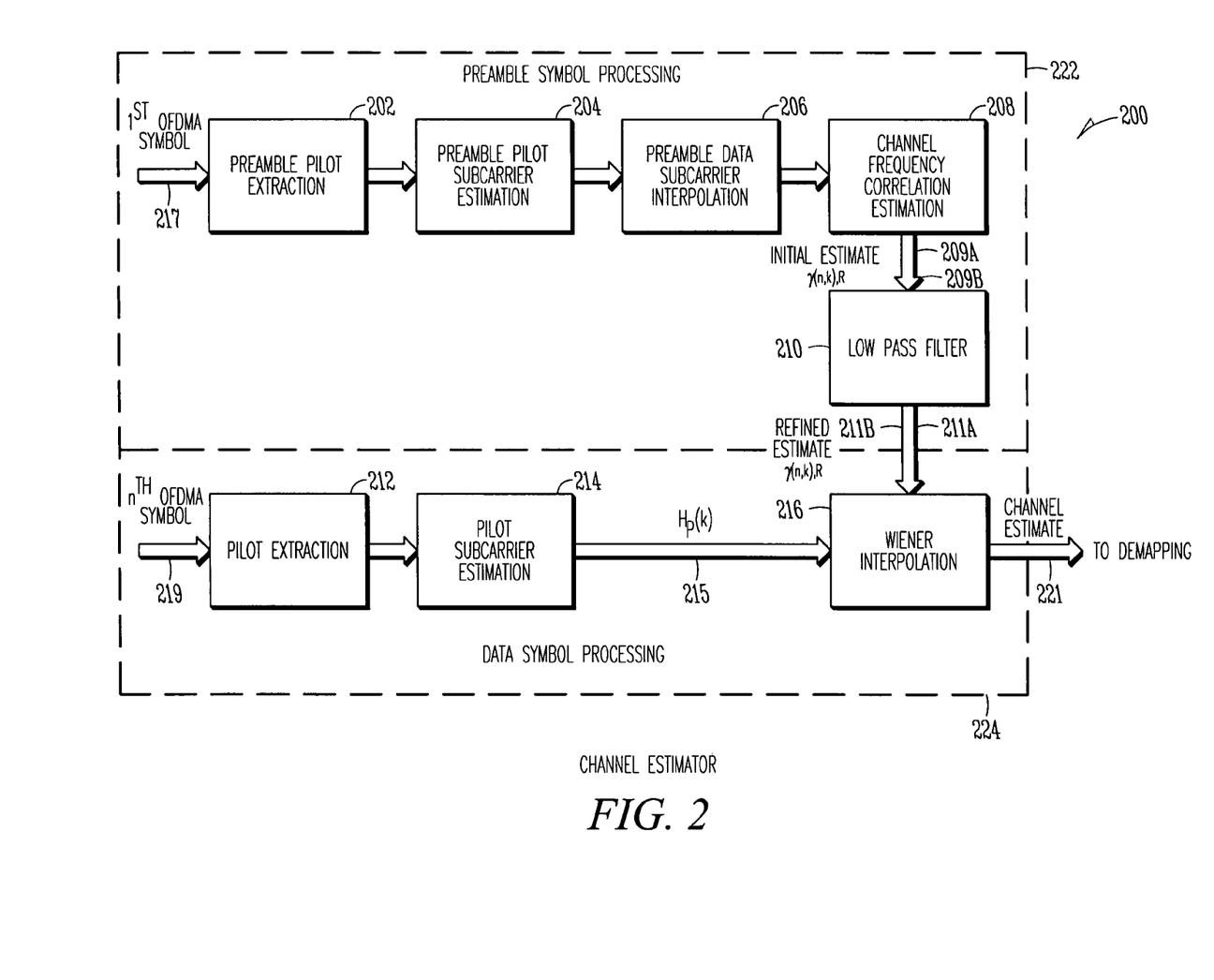
FIG. 2 illustrates a block diagram of a channel estimator in accordance with some embodiments of the present invention.

FIG. 2 illustrates a block diagram of a channel estimator in accordance with some embodiments of the present invention. Channel estimator 200 may be suitable for use as channel estimator 120 (FIG. 1), although other channel estimators may also be used. In accordance with some embodiments, channel estimator 200 includes preamble processing portion 222 and data symbol processing portion 224. Preamble processing portion 222 generates refined cross-correlation estimate 211A and refined autocorrelation estimate 211B from OFDM preamble symbol 217. Data symbol processing portion 224 generates channel estimates 221 for OFDM data symbol 219 using refined cross-correlation estimate 211A and refined autocorrelation estimate 211B provided by preamble processing portion 222 from one or more OFDM data symbols. In some alternate embodiments, the pilots extracted from the data symbols may be used to refine and to track the cross-correlation and autocorrelation estimates obtained from the preamble, although the scope of the invention is not limited in this respect.

OFDM preamble symbol 217 may include both pilot subcarriers and data subcarriers that may be used by preamble processing portion 222. OFDM data symbol 219 may include pilot subcarriers that may be used by data symbol processing portion 224. OFDM preamble symbol 217 and OFDM data symbol 219 may be provided by Fourier transform circuitry 106 (FIG. 1), although the scope of the invention is not limited in this respect. Channel estimates 221 may correspond to channel estimates 121 (FIG. 1) and may be provided to decoder 108 (FIG. 1) for each OFDM data symbol of a frame.

In accordance with some embodiments, preamble processing portion 222 includes preamble pilot extraction circuitry 202 to extract the pilot subcarriers from OFDM preamble symbol 217. Preamble processing portion 222 may also include preamble pilot subcarrier estimation circuitry 204 to generate estimates for the extracted pilot subcarriers. Preamble processing portion 222 may also include preamble data subcarrier interpolation circuitry 206 to interpolate the data subcarriers of OFDM preamble symbol 217. Preamble processing portion 222 may also include channel frequency correlation estimation circuitry 208 to determine initial (e.g., rough) cross-correlation estimate 209A between the pilot and data subcarriers. Channel frequency correlation estimation circuitry 208 may also determine initial autocorrelation estimate 209B between the pilot subcarriers. Preamble processing portion 222 may also include low-pass filter 210 to filter initial cross-correlation estimate 209A and initial autocorrelation estimate 209B to remove noise to generate refined cross-correlation and autocorrelation estimates 211A and 211B. In some embodiments, initial cross-correlation estimate 209A and initial autocorrelation estimate 209B may be matrices or may be in matrix form. As discussed herein, a cross-correlation estimate may be represented by matrix 'γ', and an autocorrelation estimate may be represented by matrix 'R'.

Data symbol processing portion 224 may include pilot extraction circuitry 212 to extract the pilot subcarriers of a current OFDM data symbol, such as current OFDM data symbol 219. Data symbol processing portion 224 may also include pilot subcarrier estimation circuitry 214 to generate pilot subcarrier estimates 215 from the pilot subcarriers of OFDM data symbols. Data symbol processing portion 224 may also include Wiener interpolation circuitry 216 which may use refined cross-correlation and autocorrelation estimates 211A and 211B and pilot subcarrier estimates 215 of the current OFDM data symbol to generate channel estimates 221 for the current OFDM data symbol. As discussed herein, pilot subcarrier estimates may be represented as $\tilde{H}_p(k)$, where k represents the pilot subcarrier index and the subscript p refers to pilot. In some embodiments, the Wiener interpolation performed by Wiener interpolation circuitry 216 may be a two-dimensional (2D) Wiener interpolation performed for the dimensions of frequency and time. Each OFDM symbol employs multiple subcarriers and the interpolation may be performed for multiple OFDM symbols received over time. The operation of channel estimator 200 is further described below.

Although channel estimator 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of channel estimator 200 may refer to one or more processes operating on one or more processing elements.

Figure 3:
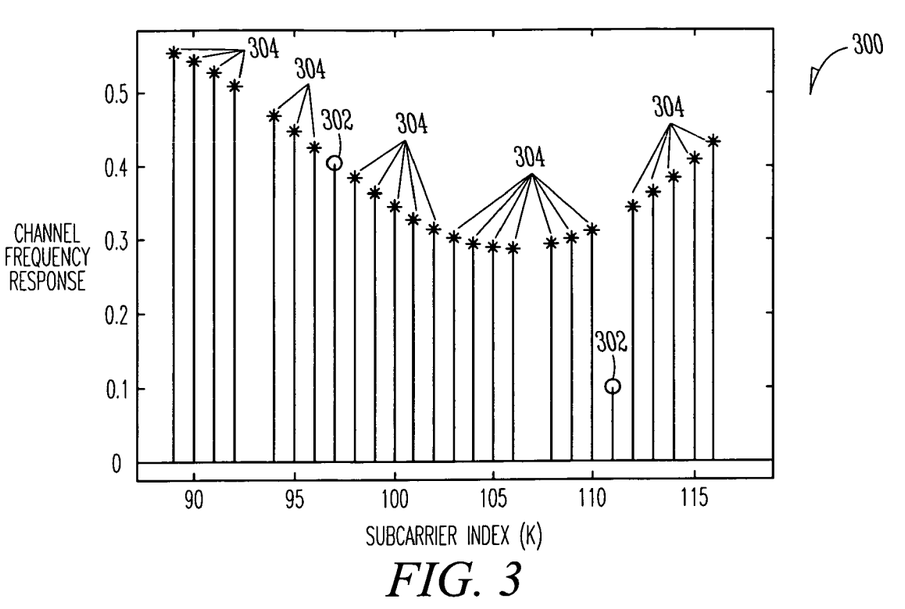
FIG. 3 illustrates an example of the frequency response of a multicarrier communication channel in accordance with some embodiments of the present invention.

FIG. 3 illustrates an example of the frequency response of a multicarrier communication channel in accordance with some embodiments of the present invention. Estimated channel frequency response 300 includes the frequency response of pilot subcarriers 302 and the frequency response of data subcarriers 304. The frequency response of data subcarriers 304 may be estimated by channel estimator 120 (FIG. 1). In some embodiments, data subcarriers 304 are identified in accordance with a downlink partial usage of subchannels (PUSC) mode. PUSC is a subcarrier allocation mode for BWA networks that operate in accordance with the IEEE 802.16(e) standard.

Figure 4:
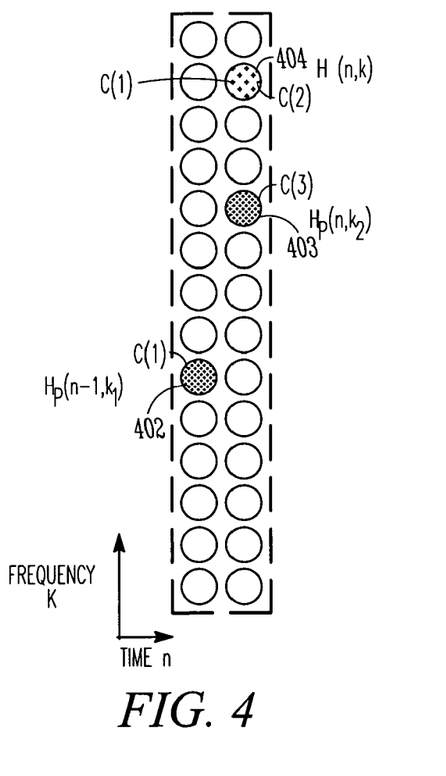
FIG. 4 illustrates pilot and data subcarriers of OFDM data symbols in accordance with some embodiments of the present invention.

FIG. 4 illustrates pilot and data subcarriers of OFDM data symbols in accordance with some embodiments of the present invention. FIG. 4 shows an example of pilot and data subcarrier allocation within a cluster of subcarriers in PUSC mode. In FIG. 4, the first vertical row of subcarriers may represent a first OFDM symbol (n−1) and the second vertical row of subcarriers may represent a second OFDM symbol (n), which may immediately follow the first OFDM symbol. In this example, data subcarrier 404, illustrated as H(n, k), is estimated based on pilot subcarrier 402, illustrated as $H_p(n-1, k_1)$, and pilot subcarrier 403, illustrated as $H_p(n, k_2)$. The Wiener coefficients generated for use in estimating data subcarrier 404 are shown as C(1) and C(2). In some IEEE 802.16 embodiments, the pilots employed by the Wiener filter of Wiener interpolation circuitry 216 (FIG. 2) may be generated from one cluster of subcarriers; however multiple clusters may also be used. In these embodiments, when operating in PUSC mode, one cluster may comprise, for example, fourteen adjacent subcarriers, although the scope of the invention is not limited in this respect. In these embodiments, since each cluster may include two pilots per OFDM symbol, the use of multiple clusters may provide more pilots for channel estimation than the use of a single cluster.

Referring to FIG. 4, to estimate data subcarrier 404 H(n, k), a linear combination of responses of pilot subcarrier $H_p(n, k_p)$ may be determined such that the channel estimation mean-square-error (MSE) may be minimized. In some embodiments, a set of received pilot subcarriers, which may be descrambled and corrupted by noise, may be represented by the following equation:

$$\tilde{H}_p = \begin{pmatrix} H_p(1) \\ H_p(2) \\ \vdots \\ H_p(P) \end{pmatrix} + \begin{pmatrix} n(1) \\ n(2) \\ \vdots \\ n(P) \end{pmatrix}, \tag{1}$$

where P is the number of available pilot subcarriers, $$\begin{pmatrix} H_p(1) \\ H_p(2) \\ \vdots \\ H_p(P) \end{pmatrix}$$

is the channel response on the pilot subcarriers, $$\begin{pmatrix} n(1) \\ n(2) \\ \vdots \\ n(P) \end{pmatrix}$$

is noise plus interference. An n(P) estimated data subcarrier may be expressed as a linear combination of pilot subcarriers with coefficients $\underline{c}=[c(1), c(2) \ldots c(P)]$, as described by the following equation:

$$\hat{H}(n,k) = \underline{c}^H \underline{\tilde{H}}_p, \tag{2}$$

where the superscript 'H' denotes the Hermitian. In these embodiments, minimum mean-square-error (MMSE) interpolator coefficients may be selected by minimizing the following cost function, $$J_c = \min(E\{\|H(n,k) - \hat{H}(n,k)\|^2\}), \tag{3}$$

where E denotes expectation. The solution for $\underline{c}$ may be the Wiener filter coefficients, which may be represented by the following equation:

$$\underline{c} = \gamma(n,k)(R_p + R_n)^{-1}, \tag{4}$$

where γ(n, k) represents the cross-correlation between data and pilot subcarriers, $R_p$ represents the autocorrelation of the pilot subcarriers, and $R_n$ represents the correlation of noise plus interference. For additive white Gaussian noise, $R_n$ may be represented by the equation $R_n = \sigma_n^2 I$, where $\sigma_n^2$ represents the noise variance for the frequency band, and I represents the correlation matrix for additive white Gaussian noise on the pilot subcarriers. The cross-correlation and the autocorrelation may thus be represented by the following equations:

$$\gamma(n,k) = E\{H(n,k)\underline{\tilde{H}}_p^H\}, \text{ and} \tag{5}$$

$$R_p = E\{\underline{\tilde{H}}_p \underline{\tilde{H}}_p^H\}. \tag{6}$$

Equations (5) and (6) indicate that Wiener interpolation uses channel frequency correlation. Furthermore, Equation (4) requires a matrix inversion. If the number of pilots used to solve the Wiener coefficients is large, the complexity of solving (4) can be high. In accordance with some embodiments of the present invention, channel estimator 200 (FIG. 2) implements correlation estimation and matrix inversion in a manner that may involve significantly less processing so that Wiener interpolation can be implemented more practically.

When statistics of the communication channel are known, channel correlations γ(n, k) and R may be calculated from the respective channel model. When the channel statistics are not known, some embodiments of the present invention may estimate the channel correlations from the OFDM preamble symbol embedded in each OFDMA frame. In these embodiments, correlation estimation using an OFDM preamble symbol may be performed once for an entire frame. Accordingly, there may be no need to estimate the channel correlations for each subsequent OFDM data symbol that follows the OFDM preamble symbol which may significantly reduce a receiver's complexity. Furthermore, in some embodiments, the correlation information estimates may be improved by applying a low pass filter 210 (FIG. 2) to raw correlation estimates (e.g., initial cross-correlation estimate 209A (FIG. 2) and initial autocorrelation estimate 209B (FIG. 2)) to generate refined cross-correlation estimate 211A (FIG. 2) and refined autocorrelation estimate 211B (FIG. 2), respectively.

In some embodiments, the preamble symbol from only one transmitting antenna may need to be used to extract the correlation information, although the scope of the invention is not limited in this respect. In these embodiments, the correlation information from one transmitting antenna may be used for another transmitting antenna with little or no performance degradation.

In other embodiments, only the tones sent by the same antenna are used for estimating the correlation. For example, the preamble tones may be partitioned into three sets (e.g., one per transmit antenna). Each antenna may be associated with one sector, which may be associated with a different direction. In these embodiments, one third of the tones in the preamble may be useful for a mobile station located in one sector (e.g., every third tone may be used). In these embodiments, the correlation estimates may be computed by autocorrelation techniques. In this example, the correlation between two tones that are k tones apart may be computed, when k is a multiple of three. When k is not a multiple of three, the correlation estimates may be interpolated or estimated from the correlation when k is a multiple of three, although the scope of the invention is not limited in this respect. In some embodiments, a correlation estimation zero tones apart may be excluded from the low pass filtering because the noise in the pilot sample may be fully correlated. For pilot subcarriers, the correlations obtained from the preamble may be modified.

In some embodiments, the pilot subcarriers, such as pilot subcarriers 402 and 403, that may be used to estimate the data subcarriers, such as data subcarrier 404, do not need to be within the same OFDM symbol, as illustrated in FIG. 4. In these embodiments, a time correlation for a subcarrier located in two OFDM symbols may be added. In some embodiments, the time correlation may be estimated from the Doppler spread in frequency of the preamble. Referring to FIG. 4, the correlation between $H_p(n-1, k_1)$ and $H_p(n, k_2)$ is the time correlation ($c_t$) multiplied by $r(k_2-k_1)$, where $r(k_2-k_1)$ is the frequency correlation estimated from preamble. The time correlation may be estimated from the Doppler spread. In some embodiments, an autocorrelation matrix (R) and a cross-correlation matrix (γ) may be generated from the same correlations described above which take the frequency/time correlations and pilot/data tone locations into account, although the scope of the invention is not limited in this respect.

In some embodiments, for a given pilot subcarrier structure, only twelve sets of Wiener coefficients may need to be calculated (e.g., in a downlink PUSC mode). These Wiener coefficients may be used for clusters of subcarriers and for OFDM symbols that follow the pilot structure within the frame. Therefore, additional Wiener coefficients may not need to be calculated for each cluster, which may further reduce computational complexity.

Figure 5:
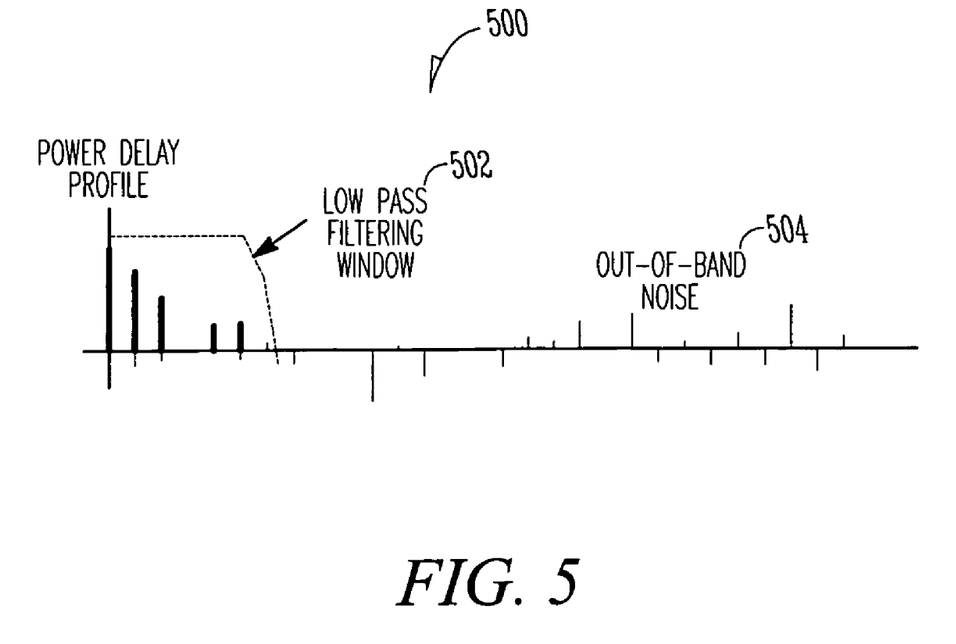
FIG. 5 is an example illustration of a low-pass power delay profile in accordance with some embodiments of the present invention.

FIG. 5 is an example illustration of a low-pass power delay profile in accordance with some embodiments of the present invention. From the channel frequency response for an OFDM preamble symbol, an estimate of the channel frequency correlation may be obtained. Because the preamble pilot subcarriers may be noisy, even highly correlated subcarriers may appear uncorrelated. Consequently the frequency correlation estimate may not be accurate when the noise level is high. Channel power delay profile 500 of some systems may have a 'low pass' property, such that the channel impulse response and the power delay profile may be usually shorter than the cyclic prefix of the OFDM symbol. In these embodiments, low pass filtering window 502 in the power delay profile domain may be applied by low-pass filter 210 (FIG. 2) to help reduce out-of-band noise 504 in the correlation estimates.

As shown in Equation (4), a matrix inversion would be required to compute the inverse of the autocorrelation estimate $\tilde{R}=R_p+R_n$. Some embodiments of the present invention may implement a recursive process to compute the inverted matrix $\tilde{R}^{-1}$ which avoids a highly complex task of matrix inversion. A matrix inversion process can be processing intensive for large matrices. In accordance with some embodiments, since the $\tilde{R}$ matrix is an auto-correlation matrix of the noise corrupted pilot signals, a matrix inversion principle may be applied allowing pilot signals to be used as inputs to update the computation. In some embodiments, the auto correlation may be calculated from the time average of the pilots based on the following equation:

$$\tilde{R}(n) = \sum_{i=1}^{n-1} \lambda^{n-i} H_p(i) H_p^H(i), \quad (7)$$

where λ is a forgetting factor with 0<λ<1. Equation (7) may be expressed in a recursive form as shown by the following equation:

$$\tilde{R}(n)=\lambda\tilde{R}(n-1)+\underline{\tilde{H}}_p(n)\underline{\tilde{H}}_p^H(n) \quad (8)$$

The inverse of $\tilde{R}(n)$ may be written in a recursive form as shown by the following equation:

$$\tilde{R}^{-1}(n)=\lambda^{-1}\tilde{R}^{-1}(n-1)-\lambda^{-1}k(n)\underline{\tilde{H}}_p^H(n)\tilde{R}^{-1}(n-1) \quad (9)$$

where $$k(n) = \frac{\lambda^{-1}\tilde{R}^{-1}(n-1)\underline{\tilde{H}}_p(n)}{1+\lambda^{-1}\underline{\tilde{H}}_p^H(n)\tilde{R}^{-1}(n-1)\underline{\tilde{H}}_p(n)}. \quad (10)$$

In Equation (10), k(n) is a scalar, $\tilde{R}^{-1}(n-1)$ is the matrix computed in the previous iteration for the previous OFDM symbol and $\tilde{R}^{-1}(n)$ is the updated matrix for the current OFDM symbol.

Referring to FIG. 2, in accordance with some embodiments, channel frequency correlation estimation circuitry 208 may estimate an initial cross-correlation estimate 209A

($\gamma$) between pilot and data subcarriers and an autocorrelation estimate 209B ($\tilde{R}(n)$) between the pilot subcarriers from an OFDM preamble symbol of an OFDMA frame. In some embodiments, channel frequency correlation estimation circuitry 208 may use equations (5) and (6) for estimating cross-correlation estimate 209A and autocorrelation estimate 209B, respectively, although the scope of the invention is not limited in this respect.

Low-pass filter 210 may perform low-pass filtering on cross-correlation estimate 209A and autocorrelation estimate 209B to remove noise to generate refined cross-correlation and autocorrelation estimates 211A and 211B. Wiener interpolation circuitry 216 may perform a Wiener interpolation using the refined cross-correlation and autocorrelation estimates 211A and 211B and pilot subcarrier estimates 215 ($\tilde{H}_p(k)$) of a current OFDM data symbol to generate channel estimates 221 for the current OFDM data symbol, in accordance with the processes described herein.

In some embodiments, performing a two-dimensional Wiener interpolation may include calculating an inverse autocorrelation estimate $[\tilde{R}(n)]^{-1}$ for a current OFDM data symbol based on a recursive process (i.e., without a matrix inversion) that uses an inverse autocorrelation estimate $[\tilde{R}(n-1)]^{-1}$ for one or more pilot subcarriers of a prior OFDM data symbol, the refined autocorrelation estimate 211B, and the pilot subcarrier estimates $\tilde{H}_p(k)$ for the current OFDM data symbol. In some embodiments, equations (8) or (9) may be used by Wiener interpolation circuitry 216. In some embodiments, Wiener filter coefficients ($\underline{c}$) may be generated for each pilot subcarrier of the current OFDM data symbol from refined cross-correlation estimate 211A and the inverse autocorrelation estimate $[\tilde{R}(n)]^{-1}$ for the current OFDM data symbol. In some embodiments, equation (4) may be used to calculate the Wiener coefficients, although the scope of the invention is not limited in this respect.

In some embodiments, Wiener interpolation circuitry 216 may generate channel estimates 221 for the current OFDM data symbol by multiplying the Wiener filter coefficients for an associated subcarrier by the observation vector ($H_p$) for the received signals on the pilot subcarriers of the current OFDM data symbol. In some embodiments, the pilot subcarrier response may be described by equation (1), and the channel estimate for the data subcarriers may be represented by equation (2), although the scope of the invention is not limited in this respect.

In some embodiments, wiener interpolation circuitry 216 may apply a forgetting factor, shown in Equation (9) as $\lambda$, to weight the inverse autocorrelation estimate for prior OFDM symbols less in relation to the pilot subcarrier estimates of the current OFDM data symbol when calculating the inverse autocorrelation estimate for the current OFDM data symbol, although the scope of the invention is not limited in this respect.

In some embodiments, low pass filter 210 may remove out-of-band high-frequency noise to generate the refined cross-correlation and autocorrelation estimates 211A and 211B. In these embodiments, low pass filter 210 may implement a pass-band response that is based on a maximum channel delay, although the scope of the invention is not limited in this respect.

In some embodiments, the OFDM preamble symbol may be transmitted by one of a plurality of antennas from a transmitting station. The OFDM data symbol may be transmitted by more than one of the antennas employing spatial diversity. Refined cross-correlation and autocorrelation estimates 211A and 211B may be used to generate channel estimates for decoding the data subcarriers of the OFDM data symbols transmitted by the more than one of the antennas.

Although some embodiments of the present invention are described as performing a Wiener interpolation and generating Wiener coefficients, the scope of the invention is not limited in this respect. In other embodiments, other linear interpolations may be performed to generate linear coefficients.

Figure 6:
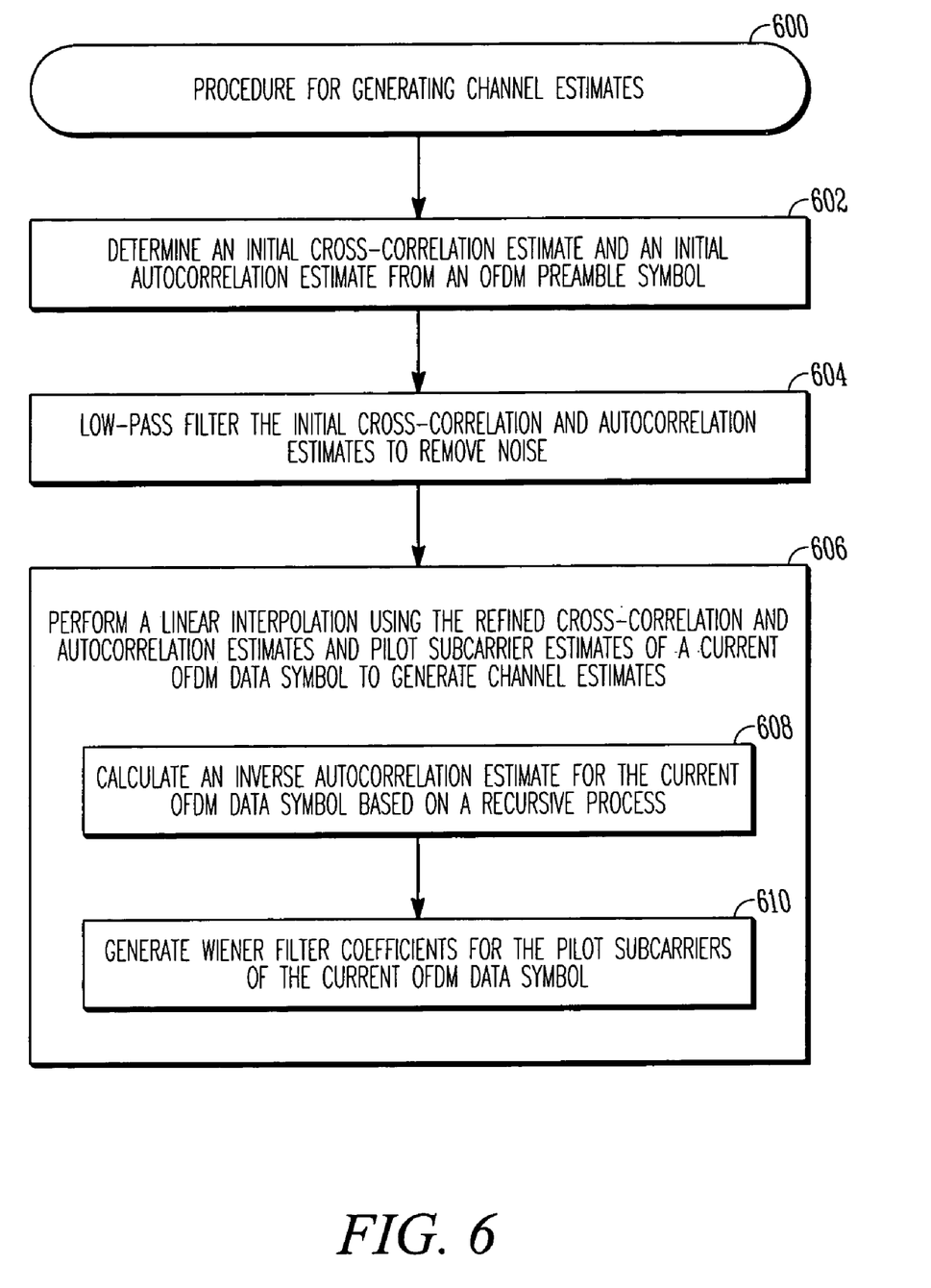
FIG. 6 is a flow chart of a procedure for generating channel estimates in accordance with some embodiments of the present invention.

FIG. 6 is a flow chart of a procedure for generating channel estimates in accordance with some embodiments of the present invention. Procedure 600 may be performed by elements of a channel estimator, such as channel estimator 200 (FIG. 2), although other channel estimators may be used.

Operation 602 determines an initial cross-correlation estimate between pilot and data subcarriers and an initial autocorrelation estimate between the pilot subcarriers from an OFDM preamble symbol of the frame. In some embodiments, operation 602 may be performed by channel frequency correlation estimation circuitry 208 (FIG. 2).

Operation 604 comprises low-pass filtering the initial cross-correlation and autocorrelation estimates to remove noise to generate refined cross-correlation and autocorrelation estimates. In some embodiments, operation 604 may be performed by low pass filter 210 (FIG. 2).

Operation 606 performs a linear interpolation using the refined cross-correlation and autocorrelation estimates and pilot subcarrier estimates of a current OFDM data symbol to generate channel estimates for the current OFDM data symbol. In some embodiments, the linear interpolation may comprise a Wiener interpolation and operation 606 may be performed by Wiener interpolation circuitry 216 (FIG. 2).

In some embodiments, operation 606 may comprise one or more operations, such as operations 608 and 610. Operation 608 comprises calculating an inverse autocorrelation estimate for the current OFDM data symbol based on a recursive process using an inverse autocorrelation estimate for one or more pilot subcarriers of a prior OFDM data symbol and the pilot subcarrier estimates of the current OFDM data symbol. Operation 610 comprises generating Wiener filter coefficients for the pilot subcarriers of the current OFDM data symbol from the refined cross-correlation estimate and the inverse autocorrelation estimate for the current OFDM data symbol.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method performed by a receiver for processing a frame of orthogonal frequency division multiplexed (OFDM) symbols comprising:
   determining initial correlation estimates for pilot and data subcarriers from an OFDM preamble symbol of the frame;
   low-pass filtering the initial correlation estimates to remove noise to generate refined correlation estimates; and
   performing a linear interpolation using the refined correlation estimates and pilot subcarrier estimates of a current OFDM data symbol to generate channel estimates for the current OFDM data symbol,
   wherein the initial correlation estimates comprise an initial cross-correlation estimate between pilot and data subcarriers and an autocorrelation estimate between the pilot subcarriers,
   wherein the low-pass filtering generates refined cross-correlation and autocorrelation estimates,
   wherein the linear interpolation is performed using the refined cross-correlation and autocorrelation estimates,
   wherein the linear interpolation is a Wiener interpolation that comprises:
   calculating an inverse autocorrelation estimate for the current OFDM data symbol based on a recursive process using an inverse autocorrelation estimate for one or more pilot subcarriers of a prior OFDM data symbol and the pilot subcarrier estimates of the current OFDM data symbol; and
   generating Wiener filter coefficients for the pilot subcarriers of the current OFDM data symbol from the refined cross-correlation estimate and the inverse autocorrelation estimate for the current OFDM data symbol.

2. The method of claim 1 further comprising generating channel estimates for the current OFDM data symbol by multiplying the Wiener filter coefficients by the received signals on the pilot subcarriers of the current OFDM data symbol.

3. The method of claim 1 further comprising:
   using the channel estimates to decode data subcarriers of the current OFDM data symbol; and
   repeating calculating the inverse, generating the Wiener filter coefficients, and generating the channel estimates for each subsequent OFDM data symbol of the frame.

4. The method of claim 2 further comprising applying a factor to weight the inverse autocorrelation estimate for prior OFDM symbols in relation to the pilot subcarrier estimates of the current OFDM data symbol when calculating the inverse autocorrelation estimate for the current OFDM data symbol.

5. A method performed by a receiver for processing a frame of orthogonal frequency division multiplexed (OFDM) symbols comprising:
   determining initial correlation estimates for pilot and data subcarriers from an OFDM preamble symbol of the frame;
   low-pass filtering the initial correlation estimates to remove noise to generate refined correlation estimates; and
   performing a linear interpolation using the refined correlation estimates and pilot subcarrier estimates of a current OFDM data symbol to generate channel estimates for the current OFDM data symbol,
   wherein the initial correlation estimates comprise an initial cross-correlation estimate between pilot and data subcarriers and an autocorrelation estimate between the pilot subcarriers,
   wherein the low-pass filtering generates refined cross-correlation and autocorrelation estimates,
   wherein the linear interpolation is performed using the refined cross-correlation and autocorrelation estimates,
   wherein the low-pass filtering removes out-of-band high-frequency noise to generate the refined cross-correlation and autocorrelation estimates, and
   wherein the low-pass filtering implements a pass-band response that is based on a maximum channel delay.

6. A method performed by a receiver for processing a frame of orthogonal frequency division multiplexed (OFDM) symbols comprising:
   determining an initial cross-correlation estimate by performing a cross-correlation between pilot subcarriers and data subcarriers from an OFDM preamble symbol of the frame;
   determining an initial autocorrelation estimate by performing an autocorrelation on the pilot subcarriers;
   low-pass filtering the initial cross-correlation and autocorrelation estimates to remove noise to generate refined cross-correlation and autocorrelation estimates; and
   performing a linear interpolation using the refined cross-correlation and autocorrelation estimates and using pilot subcarrier estimates of a current OFDM data symbol to generate channel estimates for the current OFDM data symbol,
   wherein the low-pass filtering implements a pass-band response that is based on a maximum channel delay,
   wherein the OFDM preamble is transmitted by one of a plurality of antennas from a transmitting station,
   wherein the current OFDM data symbol is transmitted by more than one of the antennas employing spatial diversity, and
   wherein the refined cross-correlation and autocorrelation estimates are used to generate channel estimates for decoding the data subcarriers of the current OFDM data symbol transmitted by the more than one of the antennas.

7. A receiver comprising:
   preamble processing circuitry to determine initial correlation estimates for pilot and data subcarriers from an orthogonal frequency division multiplexed (OFDM) preamble symbol of a frame, the preamble processing circuitry including a low-pass filter to filter the initial correlation estimates to remove noise to generate refined correlation estimates; and
   data-symbol processing circuitry operatively coupled to the preamble processing circuitry to perform a linear interpolation using the refined correlation estimates and pilot subcarrier estimates of a current OFDM data symbol to generate channel estimates for the current OFDM data symbol, wherein the initial correlation estimates comprise an initial cross-correlation estimate between pilot and data subcarriers and an autocorrelation estimate between the pilot subcarriers, wherein the low-pass filter generates refined cross-correlation and autocorrelation estimates, wherein the linear interpolation uses the refined cross-correlation and autocorrelation estimates, wherein the linear interpolation comprises a Wiener interpolation, and wherein, when performing the Wiener interpolation, the data-symbol processing circuitry:

calculates an inverse autocorrelation estimate for the current OFDM data symbol based on a recursive process that uses an inverse autocorrelation estimate for one or more pilot subcarriers of a prior OFDM data symbol and the pilot subcarrier estimates of the current OFDM data symbol; and generates Wiener filter coefficients for each pilot subcarrier of the current OFDM data symbol from the refined cross-correlation estimate and the inverse autocorrelation estimate for the current OFDM data symbol.

8. The receiver of claim 7 wherein the data-symbol processing circuitry generates channel estimates for the current OFDM data symbol by multiplying the Wiener filter coefficients by the received signals on the pilot subcarriers of the current OFDM data symbol.

9. The receiver of claim 7 further comprising a decoder to using the channel estimates to decode data subcarriers of the current OFDM data symbol, wherein the data-symbol processing circuitry repeats the calculation of the inverse, the generation of the Wiener filter coefficients and the generation of the channel estimates for subsequent OFDM data symbols of the frame.

10. The receiver of claim 8 wherein the data-symbol processing circuitry applies a factor to weight the inverse autocorrelation estimate for prior OFDM symbols in relation to the pilot subcarrier estimates of the current OFDM data symbol when calculating the inverse autocorrelation estimate for the current OFDM data symbol.

11. The receiver of claim 7 further comprising one or more omnidirectional antennas to receive the OFDM preamble symbol and the current OFDM data symbol.

12. A receiver comprising:

preamble processing circuitry to determine initial correlation estimates for pilot and data subcarriers from an orthogonal frequency division multiplexed (OFDM) preamble symbol of a frame, the preamble processing circuitry including a low-pass filter to filter the initial correlation estimates to remove noise to generate refined correlation estimates; and data-symbol processing circuitry operatively coupled to the preamble processing circuitry to perform a linear interpolation using the refined correlation estimates and pilot subcarrier estimates of a current OFDM data symbol to generate channel estimates for the current OFDM data symbol, wherein the initial correlation estimates comprise an initial cross-correlation estimate between pilot and data subcarriers and an autocorrelation estimate between the pilot subcarriers, wherein the low-pass filter generates refined cross-correlation and autocorrelation estimates, wherein the linear interpolation uses the refined cross-correlation and autocorrelation estimates, wherein the low-pass filter removes out-of-band high-frequency noise to generate the refined cross-correlation and autocorrelation estimates, and wherein the low-pass filter implements a pass-band response that is based on a maximum channel delay.

13. A receiver comprising:

preamble processing circuitry to determine an initial cross-correlation estimate by performing a cross-correlation between pilot subcarriers and data subcarriers from an orthogonal frequency division multiplexed (OFDM) preamble symbol of a frame and to determine an initial autocorrelation estimate by performing an autocorrelation on the pilot subcarriers, the preamble processing circuitry including a low-pass filter to filter the initial cross-correlation and autocorrelation estimates to remove noise to generate refined cross-correlation and autocorrelation estimates; and data-symbol processing circuitry operatively coupled to the preamble processing circuitry to perform a linear interpolation using the refined cross-correlation and autocorrelation estimates and using pilot subcarrier estimates of a current OFDM data symbol to generate channel estimates for the current OFDM data symbol, wherein the low-pass filter is to implement a pass-band response that is based on a maximum channel delay, wherein the OFDM preamble is transmitted by one of a plurality of antennas from a transmitting station, wherein the current OFDM data symbol is transmitted by more than one of the antennas employing spatial diversity, and wherein the refined cross-correlation and autocorrelation estimates are used to generate channel estimates for decoding the data subcarriers of the current OFDM data symbol transmitted by the more than one of the antennas.

* * * * *